United States Patent [19]

Fraser

[11] 3,746,960
[45] July 17, 1973

[54] HAND APPLIANCE DEVICE AND ITS ENCLOSURE

[76] Inventor: George R. Fraser, 4250 Fourth Avenue, San Diego, Calif. 92103

[22] Filed: Dec. 23, 1971

[21] Appl. No.: 211,198

[52] U.S. Cl. ..................... 320/2, 240/10.65, 310/50
[51] Int. Cl. .............................................. F21l 7/00
[58] Field of Search ...................... 310/50, 51, 89; 320/2, 3; 15/23, 3.53, DIG. 1; 206/46 BA; 240/10.6, 10.65

[56] References Cited
UNITED STATES PATENTS

| 3,341,701 | 9/1967 | Moore et al. ............... 240/10.65 |
| 3,368,090 | 2/1968 | Miller ............................. 310/50 X |
| 3,518,711 | 7/1970 | Radcliffe ........................ 320/2 X |

Primary Examiner—J. D. Miller
Assistant Examiner—Robert J. Hickey
Attorney—John M. Montstream

[57] ABSTRACT

An appliance device, particularly designed as an erasing device, is disclosed which is motor driven and having a construction such that the parts making up the enclosure can be inexpensively molded of plastic and such that a minimum of manual manipulation is needed for assembling the working parts therein. The enclosure includes a casing of at least three parts which encloses the working parts as well as providing a mounting therefore. The casing comprises a chamber member with an open top having a battery chamber for the batteries and an appliance chamber for a motor, a frame member and cover means for closing the open top. Two battery contacts are secured in place by the frame member which extends centrally of the battery chamber with the contacts located between the frame member and the bottom of the chamber member. Also a battery contact is constructed to serve as a switch element. A light socket preferably is provided for a light to beam its illumination towards the work area. The construction by which the battery contacts, the motor and the light socket are mounted in the casing is simple as to the parts required and for the assembly operation. The invention includes the enclosure or casing with its frame member as well as the complete appliance device.

29 Claims, 12 Drawing Figures

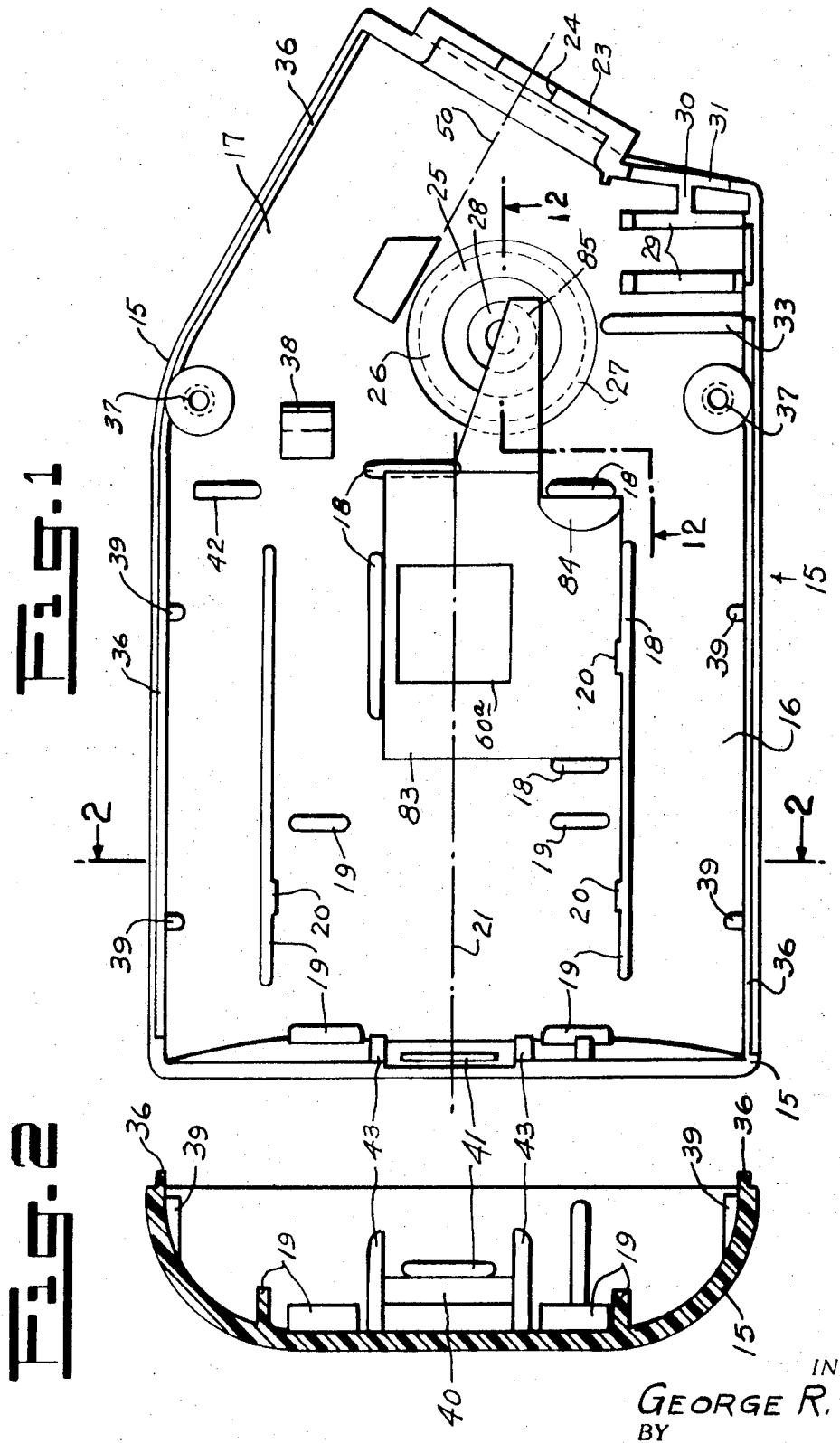

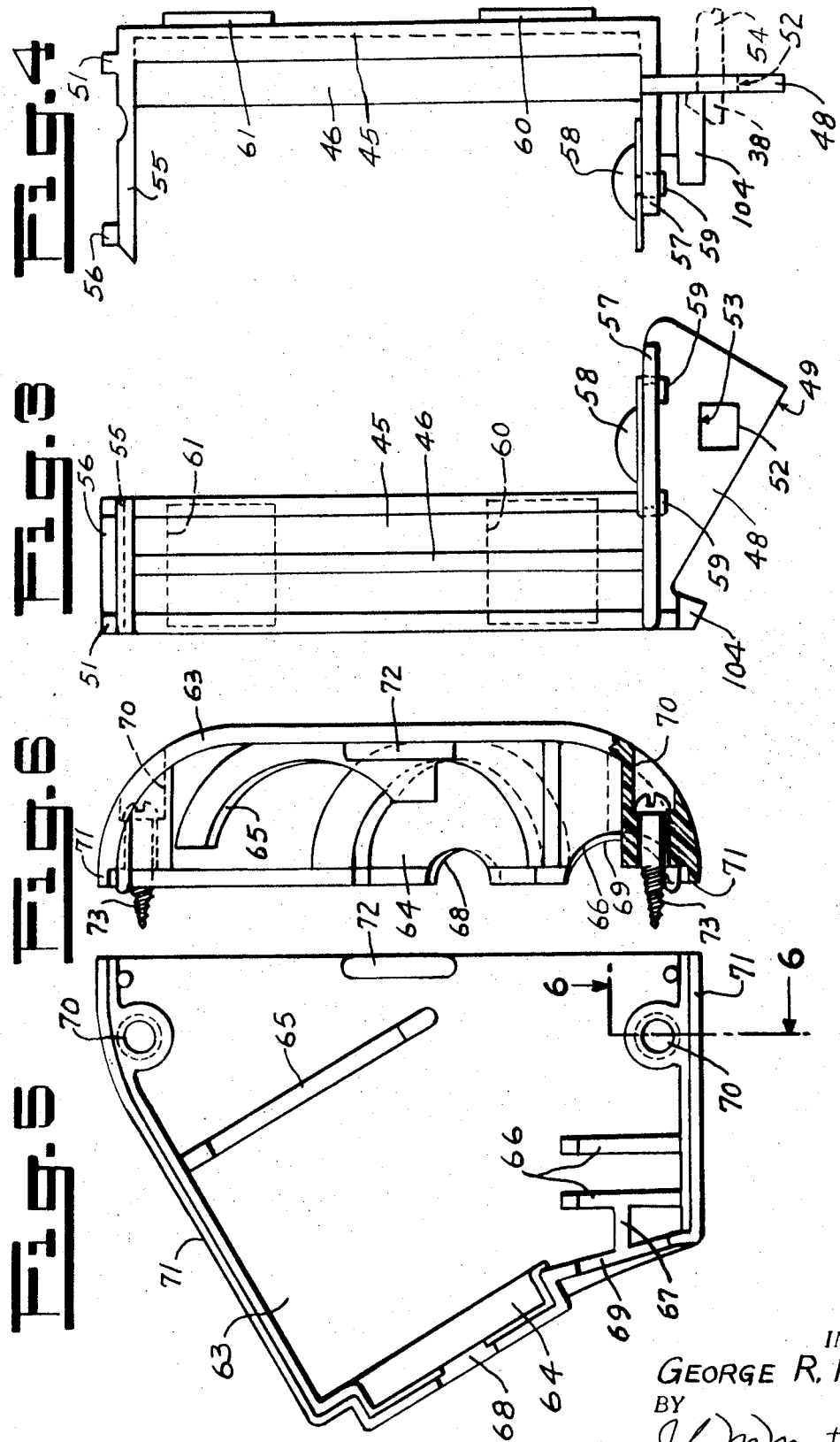

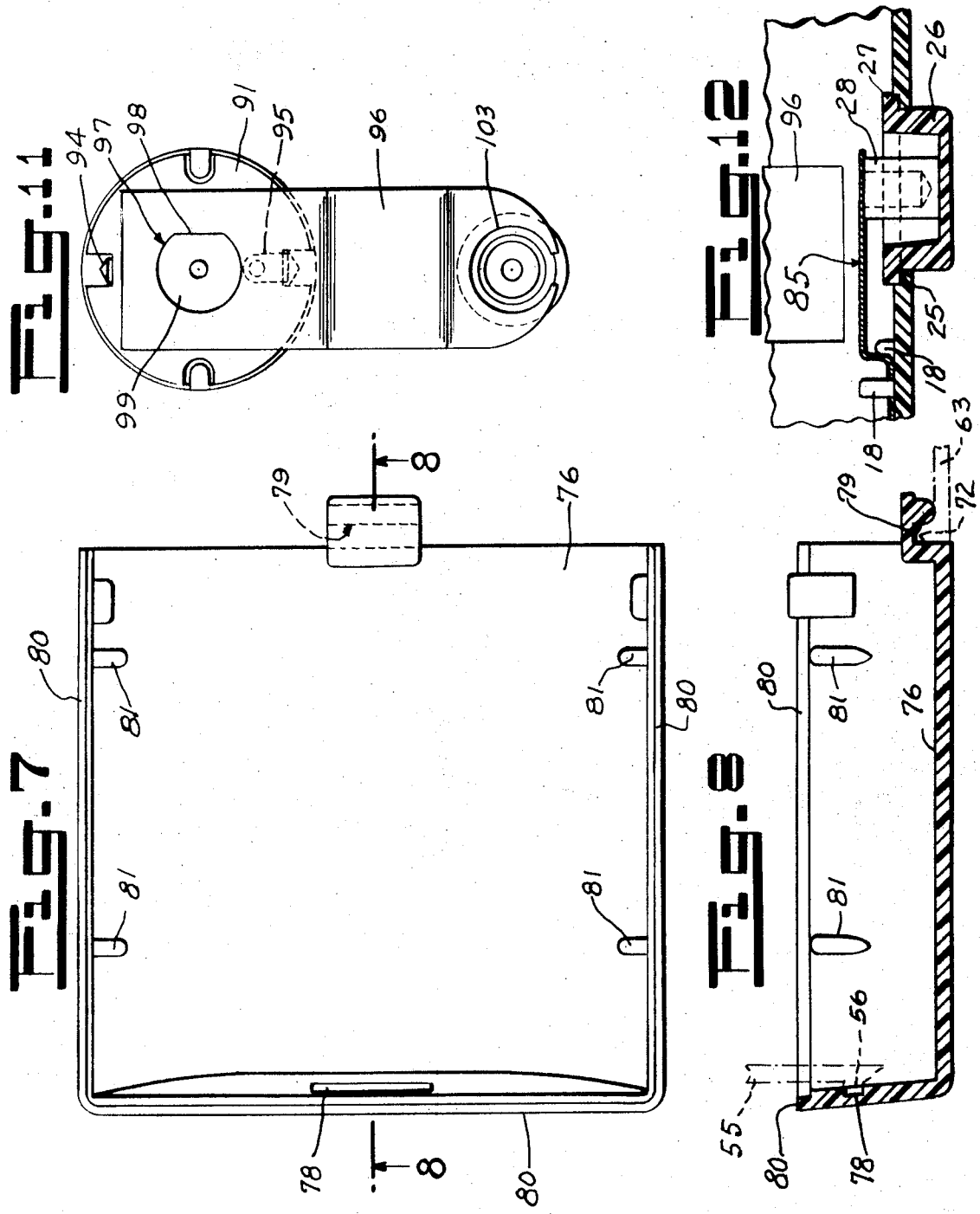

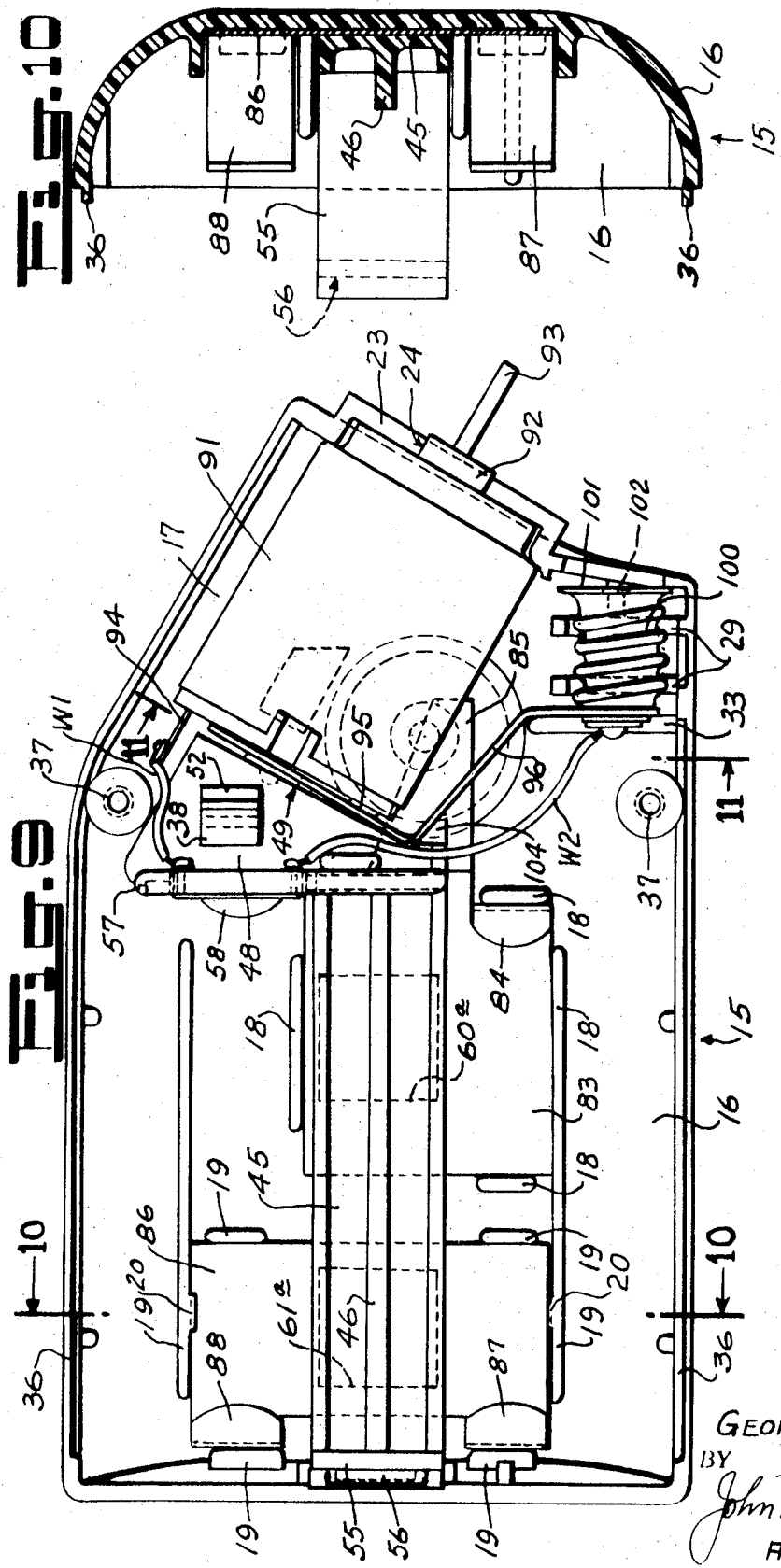

HAND APPLIANCE DEVICE AND ITS ENCLOSURE

Although the construction of the enclosure disclosed is designed primarily for an erasing device, the enclosure is applicable for any portable or hand appliance device to be energized by batteries. The appliance device includes an enclosing casing for mounting the principle elements of the complete device which includes a small motor, preferably includes a light socket, battery contacts for making electrical connection with the batteries which are received in a battery chamber and a switch for energizing the motor and/or illumination of the light in the light socket. The appliance or appliances particularly shown is a motor however used, or a light socket or both.

Objects of the invention are: to secure the battery contacts within the casing by frame member or frame overlying the same and which frame member may also serve as a battery separator;

to construct the casing so that the motor is at an angle with respect to the casing centerline for ease in use such as erasing;

to provide one battery contact on the frame member;

further as in the preceding objects and with the motor being backed-up by the frame member;

to provide a four part casing which can be molded in plastic;

to provide a structure which is easily assembled with a minimum of manipulation of parts;

a construction of electrical connections which enables a battery contact to carry a flexible switch element; and a construction of electrical connection between motor and light socket which serves also as a switch element and an anchor to hold the motor against turning.

Other objects of the invention will be more apparent from the following description when taken in connection with the accompanying drawings illustrating in twice size preferred embodiments thereof, in which:

FIG. 1 is a plan view of the chamber member of the casing with a contact for the battery and switch button mounted therein;

FIG. 2 is a sectional view taken on line 2—2 of FIG. 1.

FIG. 3 is a plan view of the frame member;

FIG. 4 is a side view of the frame member;

FIG. 5 is a plan view of the motor or appliance chamber cover;

FIG. 6 is an end view of the motor chamber cover;

FIG. 7 is a plan view of the battery chamber cover;

FIG. 8 is a sectional view taken on line 8—8 of FIG. 7;

FIG. 9 is a plan view of the device with the cover means removed;

FIG. 10 is a sectional view taken in line 10—10 of FIG. 9;

FIG. 11 is a partial view taken on line 11—11 of FIG. 10; and,

FIG. 12 is a partial sectional view taken on line 12—12 of FIG. 1.

The appliance or erasing device is a self contained unit with the motor being driven by two dry cells. The enclosure or casing comprises at least three parts and preferably four parts which are molded of plastic. The parts are a chamber member, having a battery chamber and an appliance or motor chamber, a frame member or frame and cover means which preferably is two parts including an appliance or motor cover secured to the chamber member and a battery cover which is releasably secured in position over the battery chamber. The separate internal parts are two battery contact means, a motor, preferably a light socket and a connector.

The chamber member 15, FIG. 1, includes a battery chamber 16 at one end thereof and a motor or appliance chamber 17 at the other end so that the two chambers have adjacent ends. Preferably the motor chamber is angularly disposed with respect to the battery chamber. The battery chamber has a bottom carrying low ribs to provide a first contact locating means 18 for a single battery contact means at one end of the battery chamber and a second contact locating means 19 for a double battery contact means at the other end of the battery chamber. The long longitudinally extending ribs of the contact locating means also serve as battery spacers. The remains 20 of molding sprues may provide frictional grips for the contact means if desired. Contact locating means may be carried by the bottom of the chamber member or the bottom of the frame member or part of one member and part on the other member as desired, however, it seems simpler for manufacture and assembly to provide these means on the bottom of the chamber member as illustrated. The battery chamber has a longitudinal axis 21.

The appliance or motor chamber preferably extends at an angle with respect to the longitudinal axis 21, shown as about 30° although the angle may be any angle desired in this region, for greater ease in use. The end wall of the chamber 17 has a half cup 23 therein of a diameter to receive the end of an electric motor. The cup has a recess 24 therethrough to receive a boss on the motor through which boss the motor shaft extends. The side or bottom wall of the motor chamber has a button hole 25 to receive a switch button 26, FIG. 12, having a retaining flange 27. A switch boss 28 may be provided to engage and operate a switch. The motor chamber has a light socket cradle 29 such as formed by semicircular seats in a pair of spaced flanges and forming half of a cradle means. A web 30 adjacent to a light opening 31 in the end wall engages in a notch in a light socket so that the latter is held against turning when a light is threaded into or out of the socket. There is a locating flange 33 adjacent to the cradle the purpose of which will be explained hereinafter. Aligning flange means 36 along the edges of the chamber member aligns and aids in retaining the cover means thereon.

A pair of screw holes 37 are located in pillars on opposite walls of the motor chamber to receive screws for retaining the cover means on, and particularly a motor cover, secured to the chamber member. A resilient hook 38 projects upwardly from the bottom of the chamber member which is integral with this member, the purpose of which will appear. Spacing ribs 39 on the inner side walls engage their respective battery. There is a recess 40 in the end wall of the battery chamber the depth of which is increased by a rib 41. A frame rest 42 may be provided on the bottom of the chamber. Frame aligning ribs 45 project from the end wall of the battery chamber which prevent lateral displacement of a frame or frame member now to be described.

The casing includes a separable frame member or frame 45, FIGS. 3 and 4, which may carry a spacing rib 46 extending lengthwise thereof which with the frame serves as a battery spacer. The frame carries a plate 48 having a back-up edge 49 which engages or approximately engages the inner end of the motor to retain the motor endwise in position in the motor chamber. With the motor chamber extending at an angle of 30°, the edge 49 extends at an angle of 60° with respect to the chamber member axis or at right angles to the axis of the motor chamber.

Suitable retaining means are provided to removably secure the frame member within the chamber member. This means is preferably one which uses a snap catch for securing and removing the frame member with ease. The retaining means shown includes a frame projection carried by one of the parts of the chamber member and the frame member and a recess in the other member for receiving the projection. The construction shown uses a projection 51 at one end of the frame which is received in the recess 40 in the end wall of the battery chamber. The frame retaining means includes snap means at the other end of the frame member and includes a hook recess shown as a hole 52 in the plate which receives the flexible hook 38. The hole is shown as rectangular, or particularly square, to pass the head of the hook therethrough. The recess is located with respect to the hook such that the edge 53 of the recess is engaged by the face of the hook shank 54, FIG. 4, and prevents longitudinal movement of the frame or frame member. Also the recess or hole 52 has a width corresponding to the width of the hook so that this end of the frame is held against lateral movement by the hook. The frame carries an extension 55 adjacent to the end wall of the chamber and extending above the edge and with a cover projection 56. The frame also has an end wall 57 to which a single battery contact 58 is suitably attached such as by bendable fingers 59 which are projected through holes in the end wall and then bent over. The frame member may carry contact locating means rather than the bottom of the chamber member as illustrated by rectangular pads 60 and 61 which are to be received in cooperating holes 60a and 61a in the contact means 83 and 86 respectively. Also one contact locating means may be carried by one member and the other contact locating means may be carried by the other member so that at least one contact locating means may, therefore, be carried by one of the frame member or the chamber member.

Cover means closes the open top of the chamber member which means preferably is in two parts, namely, a motor cover 63, FIGS. 5 and 6, and a battery cover, FIGS. 7 and 8. The motor cover has a half cup 64 in the end wall which completes a full cup with the half cup 23 of the chamber member to receive, locate and retain the forward end of the motor in place. A motor cradle 65 of arcuate form may be included to additionally retain the motor in position within the motor chamber. The cover has also a light socket cradle 66 which with the cooperating cradle 29 forms a cradle means for retaining the light socket in position and a web 67 engages a notch in the light socket to cooperate with the web 30 of the chamber member to prevent turning of the socket in the cradle means when a light is threaded into or out of the socket. The motor cover end wall has an arcuate opening 68 to receive a boss on the motor and a light opening 69 at the light socket cradle 66. Two screw holes 70 in the cover receive screws 73 which are threaded into the threaded screw holes 37 in the chamber member to secure the motor cover to the chamber member. Aligning flanges 71 at the edges of the motor cover cooperate with the aligning flanges 36 of the chamber member. A snap lock ridge 72 provides an anchor for the battery cover.

The cover means, if in two parts as illustrated, includes a battery cover 76, FIGS. 7 and 8, which closes the open top of the battery chamber and is retained in place with a suitable snap lock. The end wall 77 carries a recess 78 which receives the projection 56 carried by the extension 55 on the frame member to releasably retain this end of the battery chamber cover upon the chamber member. The other end of this cover has a snap catch groove 79 which is a projecting tab conveniently integral with the center of this end of the cover. The plastic cover is thin enough at the center so that it is resilient and can be depressed inwardly to release the groove from the snap lock ridge whereupon the cover is moved endwise to release the projection 56 from its cooperating recess 78. The edges of the battery cover have aligning flanges 80 which cooperate with the aligning flanges 36 on the edges of the chamber member. Preferably the inside of this cover has battery spacers or positioners 81. With a one piece cover means for enclosing both chambers, the screws 73 would secure the same to the chamber member.

The chamber member is shown with the parts assembled therein in FIGS. 9 and 10. A first battery contact means 83 is received within its locating means 18 and has a single flexible contactor 84 projecting upwardly so as to engage the anode of a dry cell battery. This contact means also has a switch finger 85, FIGS. 1 and 12, extending over to the switch button 25 or particularly to the switch boss 28. A second battery contact means 86 is received in its contact locating means 19 and it has two spaced and resilient contacts 87 and 88. The outer end of contact 87 is bent inwardly to assure engagement with the bottom of its battery and the end of the contact 88 is bent inwardly to assure engagement with the anode of its or a second battery. The two batteries are connected in series by the contact means.

The frame or frame member 45 is positioned in the chamber member with the projection 51 engaging in the recess 40 and the hook 38 is flexed by its slanted end so as to enter the recess or hole 52 and snap into engagement with the top surface of the plate 48 and the shank 54 into contact with the hole edge 53 to anchor this end of the frame within the chamber member. Since the frame member straddles the contact locating means and overlies the two battery contact means 83 and 86 with a space provided between the bottom of the chamber member and the bottom of the frame member approximating the thickness of the contact means, these two means are retained in position by the frame member and the construction described. In fact with the contact locating means having a height greater than the space between the frame member and the bottom of the chamber member, the contact means are locked in their locating means. The two contact means are removably retained in the chamber member because of the removability of the frame member.

The forward end of the motor 91 is received in the half cup 43 with a boss 92 thereon being received in the hole 24 in the end wall. For an erasing device the motor shaft 93 receives an eraser. The inner end of the motor has a motor contact 94 connected by a wire W1 to the battery contact 58 such as with a finger 59. The other motor contact 95 is engaged by a connector or connector means 96 of metal between the end of the motor and the back-up edge 49 of the frame plate 48. The connector means, FIG. 11, has a hole 97 therethrough with a flat 98 which receives a flatted boss 99 on the motor so that the motor is held against turning thereby.

The connector means 96 preferably extends to a light socket 100, when one is provided, which socket has a flange 101 with notches 102. The web 30 on the chamber member and the web 67 on the motor cover engage in their respective notch and hold the socket against turning when a light is threaded into or out of the socket. The socket is retained in position by the socket cradles 29 and 66. The connector has a socket recess at its socket end the edge of which engages the socket for electrical connection therewith. The recess is open at an edge so that wire W2 between the cener terminal of the socket and the battery contact 58 can be passed therethrough. The locating flange 33 and an abutment 104 on the frame member assist in retaining the connector or connector means in position.

The connector means 96 serves at least three functions in the construction illustrated, and serves four functions when a light socket is provided as shown, namely, prevents turning of the motor, as a switch element with switch finger 85, as a connection between the finger 85 and the motor and as an electrical connection between finger 85 and the light socket. The motor and light socket are connected in parallel so that when the light burns out the motor continues to be connected with the switch and batteries and to operate.

The cup 23,64 with the back-up plate 48 for the motor and the cradles 29 for the light socket constitute supporting means for the appliances within the appliance or motor chamber.

This invention is presented to fill a need for improvements in a hand motor driven device and its enclosure. It is understood that various modifications in structure, as well as changes in mode of operation, assembly and manner of use, may and often do occur to those skilled in the art, especially after benefiting from the teachings of an invention. This disclosure illustrates the preferred means of embodying the invention in useful form.

What is claimed is:

1. An enclosure for batteries having terminals to be connected by battery contact means and to receive at least one appliance to be energized by the batteries comprising a chamber member having a battery chamber at one end thereof with a bottom and end wall, the chamber member having an appliance chamber at the other end thereof, the two chambers having adjacent ends, the chamber member having an open top, a separable frame member extending longitudinally the length of the battery chamber and centrally of the battery chamber and spaced from the bottom thereof sufficiently to receive and retain contact means therebetween, retaining means securing the frame member in the battery chamber, a first contact locating means carried by one member at the end of the battery chamber adjacent to the appliance chamber, a second contact locating means carried by one of the members spaced from the first contact locating means and at the other end of the battery chamber, supporting means carried by the appliance chamber to retain at least one appliance therein, and cover means secured to and enclosing the open top of the chamber member.

2. An enclosure as in claim 1 in which at least one of the contact locating means is carried by the bottom of the chamber member and straddled by the frame member.

3. An enclosure as in claim 2 in which the other contact locating means is carried by the bottom of the chamber member and straddled by the frame member.

4. An enclosure as in claim 1 in which at least one contact locating means is carried by the frame member.

5. An enclosure as in claim 1 in which the retaining means for the frame member includes a projection at the end of one member, a recess in the other member receiving the projection, and snap means carried by the members at or adjacent to the other end of the frame member.

6. An enclosure as in claim 5 in which the snap means includes a snap recess carried by one of the members, and a resilient hook carried by the othermember and engaging in the snap recess.

7. An enclosure as in claim 6 in which the snap recess is carried by the frame member and the resilient hook is carried by the chamber member.

8. An enclosure as in claim 7 including a single battery contact carried by the frame member at the end thereof adjacent to the appliance chamber and positioned to be engaged by a terminal of a battery carried in the battery chamber.

9. An enclosure as in claim 1 in which the supporting means includes motor supporting means, the appliance chamber extending at an angle with respect to the battery chamber and has an end and the frame member including a motor locating and back-up plate extending into the appliance chamber and having an angular edge, and the angular edge being spaced from the end of the appliance chamber a distance to receive a motor between the angular edge and the end of the appliance chamber and to back up the motor.

10. An enclosure as in claim 9 in which the retaining means for the frame member includes an interengaging recess carried by one member and a projection carried by the other member at one end thereof, a snap recess carried by the back-up plate, and a resilient hook carried by the chamber member and engaging the snap recess.

11. An enclosure as in claim 1 in which the cover means includes an appliance cover enclosing the appliance chamber and a battery cover enclosing the battery chamber, means securing the appliance cover to the chamber member, and means releasably securing the battery cover to the appliance cover and the frame member.

12. An enclosure as in claim 11 in which the center of the battery cover adjacent to the appliance cover is flexible, a catch on one cover and a cover hook on the other cover releasably engaging the catch, a cover recess on the other end of the battery cover, the frame member at the end of the battery chamber having an extension projecting above the edge of the latter, a projection carried by the extension of the frame member and engaging in the cover recess.

13. An enclosure as in claim 1 in which the supporting means includes a light socket cradle carried by the chamber member at the end of the appliance chamber and by the cover means.

14. An enclosure as in claim 9 in which the supporting means includes a light socket cradle carried by the chamber member at the end of the appliance chamber and by the cover means.

15. An appliance device in combination with the enclosure of claim 1 including a first contact means received in the first contact locating means and having a first single contact located to engage a battery terminal, a second single contact carried by the enclosure and located to be engaged by a battery terminal, a double contact means received by the second contact locating means and having two spaced contacts each located to engage a battery terminal, an appliance having two terminals received by the supporting means, one appliance terminal being electrically connected with the first single contact including a switch, and the second appliance terminal being electrically connected with the second single contact, and means to operate the switch.

16. An appliance device as in claim 15 in which the supporting means includes motor supporting means, and the appliance being a motor received in the motor supporting means.

17. An appliance device as in claim 15 in which the supporting means includes a light socket cradle means, and the appliance being a light socket received in the light socket cradle means.

18. An appliance device as in claim 16 in which the supporting means includes a light socket cradle means, and a second appliance being a light socket received in the light socket cradle means and electrically connected in parallel with the motor.

19. An appliance device as in claim 15 in which the contact locating means are carried by the bottom of the chamber member with the frame member straddling the same.

20. An appliance device as in claim 15 in which the retaining means for the frame member includes a projection carried by one member and a recess in the other member located to receive the projection, said projection and recess being located at one end of the frame member, and snap means carried by the members at or adjacent to the other end of the frame member.

21. An appliance device as in claim 20 in which the snap means includes a snap recess carried by the frame member and a resilient hook carried by the chamber member and received in the snap recess.

22. An appliance device as in claim 20 in which the second single contact is carried by the frame member.

23. An appliance device as in claim 16 in which the appliance chamber extends at an angle with respect to the battery chamber and has an end wall, the frame member including a motor locating and back-up plate extending into the appliance chamber and having an angular edge, and the angular edge being spaced from the end wall of the appliance chamber a distance to receive the motor between the angular edge and the end wall of the appliance chamber and to back-up the motor.

24. An appliance device as in claim 23 in which the retaining means for the frame member includes a projection carried by one member and a recess in the other member and located at the end of the frame member away from the appliance chamber, a snap recess carried by the back-up plate, and a resilient hook carried by the chamber member and engaging the snap recess.

25. An appliance device as in claim 15 in which the cover means includes an appliance cover enclosing the appliance chamber and a battery cover enclosing the battery chamber, means securing the appliance cover to the chamber member, and means releasably securing the battery cover to the appliance cover and the frame member.

26. An appliance device as in claim 18 in which one of the motor terminals is on the end thereof, a boss on the same end of the motor that carries the motor terminal, connector means carried by the motor boss and engaging said motor terminal and the socket, and the switch being located to engage the connector means.

27. An appliance device as in claim 26 in which the motor boss has a flat, and the connector means has a flatted hole receiving the boss to hold the motor against turning.

28. An appliance device as in claim 27 in which the switch is a finger extending from the first contact means.

29. An inclosure as in claim 1 including a first battery contact means received in the first contact locating means and between the frame member and the bottom of the chamber member, and a second battery contact means received in the second contact locating means and between the frame member and the bottom of the chamber member.

* * * * *